D. C. STILLSON.
Machine for Rounding and Sealing the Ends of Wrought-Iron Tubes.

No. 168,588. Patented Oct. 11, 1875.

Witnesses.
Geo Gray
H. C. Hale

Daniel C. Stillson
by his attorney
J. P. Hale

UNITED STATES PATENT OFFICE.

DANIEL C. STILLSON, OF BOSTON, MASSACHUSETTS.

IMPROVEMENT IN MACHINES FOR ROUNDING AND SEALING THE ENDS OF WROUGHT-IRON TUBES.

Specification forming part of Letters Patent No. 168,588, dated October 11, 1875; application filed April 7, 1875.

*To all whom it may concern:*

Be it known that I, DANIEL C. STILLSON, of Boston, in the county of Suffolk and State of Massachusetts, have invented certain new and useful Improvements in Machines for Rounding and Welding Metallic Tubes; and I do hereby declare that the following is a full, clear, and exact description thereof, which will enable others skilled in the art to which it pertains to make and use the same, reference being had to the accompanying drawing and to the letters of reference marked thereon, which form a part of this specification.

Figure 1:
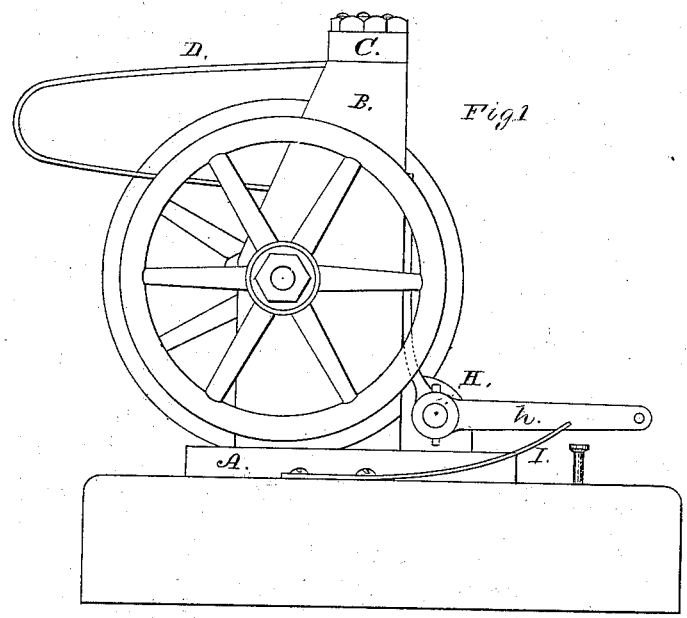
Figure 2:
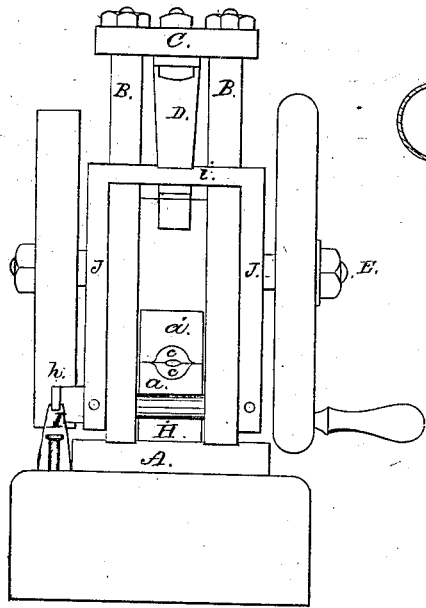
Figure 3:
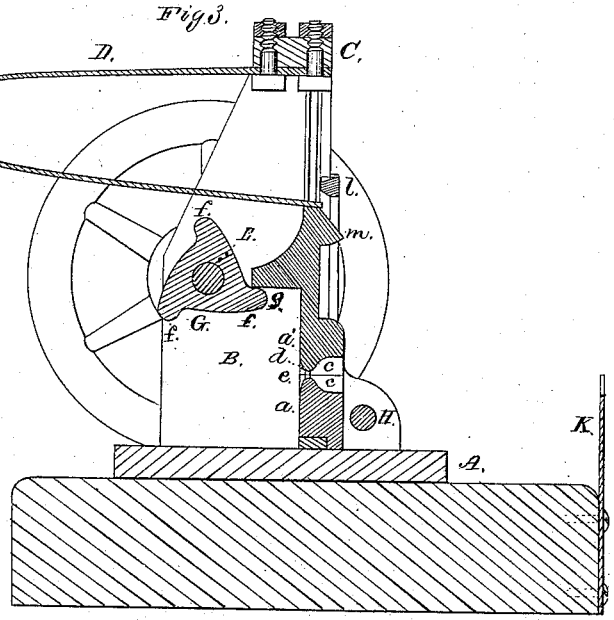

In the said drawing, Figure 1 is a side elevation, Fig. 2 a front elevation, and Fig. 3 a central, vertical, and longitudinal section, of a machine embodying my invention.

My invention relates to a machine for rounding and sealing or welding iron pipes without the employment of a mandrel; and consists in the peculiar construction and arrangement of the parts, as hereinafter referred to and claimed.

Figure 4:
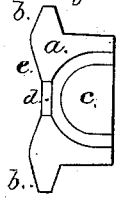

In the said drawing, A denotes the base of the machine, the same consisting of a thick metallic plate, which is to be firmly secured to a supporting-block or other solid foundation. B B are two columns or standards, which extend up from the base, and are connected at their upper ends by a cap, C. Between the said two standards the die for forming and closing the end of the pipe is disposed, such consisting of two parts, $a$ $a'$, the former being stationary and resting upon the base A, while the latter slides in a vertical plane between the standards, each of the said parts being formed with vertical ribs, which are inserted in grooves formed in the inner face of the standards. D is a bow-spring, the outer end of which is bolted to the under side of the cap C, its other end resting upon the top of movable part $a'$ of the die. This spring is formed tapering both in width and thickness throughout its entire length, so that the stress exerted by it upon the movable part of the die shall be analogous to that which the arm of a workman gives to a hammer while forging or welding a piece of iron or steel. The working-face of each part of the die is of a similar form, the same being as shown in Fig. 4, which is a face view of the part $a$ of the die. In constructing the die each block, in which the same is made, has formed on its front a semicircular cavity, $c$, having a shallow channel, $d$, leading into a semi-conical concavity, $e$, formed on the rear face of the die-block. E is the driving-shaft, which extends horizontally through the standards B B, and carries upon one end a balance-wheel, and upon its other a drum or pulley for imparting motion to the shaft. Securely affixed to the said shaft, and between the standards B B, is a hub, G, which has three, or any other suitable number of arms, $f$ $f$, which, when the driving-shaft is put in revolution, consecutively strike against a shoulder, $g'$, disposed on the rear of the part $a'$ of the die, and thereby serving to intermittently raise the said part $a'$ against the stress of the spring D, the latter, when the arms are out of action, forcing the said part of the die down upon its fellow part $a$, or an article placed between the two. H is a rocker-shaft, which is supported in bearings in the lower part of the standards B B, such shaft having an arm or lever, $h$, which extends horizontally therefrom, and which, when the machine is in use, is to be connected at its front end, by a pitman, with a foot-treadle suitably located beneath the same. I is a spring, whose free end rests against the under surface of the lever $h$. Attached to the said shaft H is a rectangular frame, J, whose upper bar $i$ is forced by the spring I up against the front face of the standards B B, such bar being provided with a lip, $l$, which, when the part $a'$ of the die is raised upward and the lever $h$ is released from the downward action of the treadle, catches under an inclined shoulder, $m$, and instantaneously stops the action of the machine. K is a rest or guide, which is disposed in front of the die, the same serving to support and guide the pipe while being treated, such rest being shown in Fig. 3.

In operating with my improved machine, a pipe which is to have its end rounded and sealed or welded is first to be cut off of a length a little greater (say from one-eighth to one-quarter of an inch for each end of the pipe to be sealed) than that required the pipe to have when finished. The pipe is next to have the end to be treated heated to a welding heat, and in such state is to be placed between the parts of the die, with the heated end flush with the rear face of the die-block. The lever *h* is to be next moved downward, so as to allow the movable part of the die to be reciprocated. This is effected by placing the foot upon the treadle, and pressing it downward, so as to throw back the lip *l* of the frame J out of the path of movement of the inclined shoulder *m* of the movable part *a'* of the die. The driving-shaft is next put in rotation, when the movable part of the die will, by the action of the spring I and the cams or series of lifting-arms arranged on the driving-shaft, be alternately raised and depressed, so as to produce a series of intermittent blows. Owing to the greater diameter or size of the end of the pipe when first introduced between the parts of the die, the blows thereon will be comparatively lighter. The workman continually turning the pipe, the end thereof will be gradually reduced and forced into the shape of the die, the surplus portion being drawn out and acted on by the channel and the rear concavity of the die, such serving to hold and draw out the part of the pipe to be rounded and welded, and thus prevent the same from collapsing, as would be liable to result were the two parts of the die formed with only the semicircular cavity. By the continued rotation of the shaft the pipe rapidly approaches the desired shape, receiving at first light blows and increasing heavier ones, until it is completely formed and welded, when the surplus portion, connected to the welded end by a small wire-like neck, may be readily severed.

I would remark that my machine, by a simple change in the form of the die, to correspond with the shape to be given to the article to be formed, may be employed for forming and welding or reducing various other articles, such as pipe-couplings, whose ends may have the same diameter, or whose ends may be of a different diameter, to couple pipes of differing size; or such may be employed for drawing out or reducing cylinders to a smaller uniform diameter, or to a tapering form, as may be desirable.

Having described my invention, what I claim is—

1. In a machine for forming and welding the ends of metallic pipes, the die *a a'*, having each of its faces formed with a semi-globular recess, *c*, a semi-recess, *e*, and connecting-groove *d*, substantially as shown and described.

2. The improved machine for forming and welding the ends of metallic tubes, consisting of the die, having stationary and movable parts *a a'*, the tapering actuating-spring D, the series of lifting-arms *f*, and the rocker catch-bar provided with a lip, *l*, and mechanism for throwing the same out of action, the whole being constructed and arranged in manner as described.

In testimony that I claim the foregoing as my own invention, I affix my signature in presence of two witnesses.

DANL. C. STILLSON.

Witnesses:
F. P. HALE,
F. C. HALE.